United States Patent [19]

Kumagai et al.

[11] Patent Number: 5,101,118
[45] Date of Patent: Mar. 31, 1992

[54] SYNCHRONIZATION COMPENSATING CIRCUIT FOR USE IN SCANNING TYPE DISPLAY CIRCUIT

[75] Inventors: Toshiyuki Kumagai; Hiroyuki Suzuki, both of Tokyo, Japan

[73] Assignee: NEC Corporation, Tokyo, Japan

[21] Appl. No.: 574,872

[22] Filed: Aug. 30, 1990

[30] Foreign Application Priority Data

Aug. 30, 1989 [JP] Japan ................... 1-226090

[51] Int. Cl.[5] ................... H03K 5/00; H03K 5/13
[52] U.S. Cl. ................... 307/269; 307/262; 328/63; 328/72; 328/137; 328/154
[58] Field of Search ........... 328/63, 72, 104, 137, 328/154; 307/269, 262, 260

[56] References Cited

U.S. PATENT DOCUMENTS

| | | | |
|---|---|---|---|
| 4,290,022 | 9/1981 | Puckette | 328/154 |
| 4,328,588 | 5/1982 | Smithson | 328/72 |
| 4,999,526 | 4/1991 | Dudley | 307/269 |

Primary Examiner—Timothy P. Callahan
Attorney, Agent, or Firm—Sughrue, Mion, Zinn Macpeak & Seas

[57] ABSTRACT

A synchronization compensating circuit for use in a scanning type display circuit, comprises a first multistage delay circuit receiving a basic clock for generating K delayed clocks, a second multistage delay circuit receiving an output of the first multistage delay circuit for generating L delayed clocks, and a timing signal generating circuit receiving a horizontal synchronization signal for generating a latch signal. A first selection signal generation circuit latches a first phase of the basic clock and the K delayed clocks in response to the latch signal, and a second selection signal generation circuit latches a second phase of the basic clock and the K delayed clocks in response to the latch signal. A third selection signal generation circuit latches the L delayed clocks in response to the latch signal. Each of the first to third selection signal generation circuit generates a selection signal corresponding to a received clock fulfilling a predetermined condition. A selection circuit receives the basic clock and the K and L delayed clocks for outputting a delayed clock corresponding to the selection signal outputted from the first signal generation circuit in preference to the selection signal from the second and third selection signal generation circuits, and a delayed clock corresponding to the selection signal outputted from the second selection signal generation circuit in preference to the selection signal from the third selection signal generation circuit when the selection signal is not outputted from the first selection signal generation circuit.

3 Claims, 4 Drawing Sheets

FIGURE 2

SYNCHRONIZATION COMPENSATING CIRCUIT FOR USE IN SCANNING TYPE DISPLAY CIRCUIT

BACKGROUND OF THE INVENTION

1. Field of the Invention

The present invention relates to a synchronization compensating circuit for use in a scanning type display circuit, and more specifically, a circuit for compensating a synchronization deviation in a synchronization circuit which generates on the basis of a basic clock a scanning clock used in a circuit for superimposing characters or figures into a scan type display screen of a television receiver, a video display, etc.

2. Description of Related Art

In the prior art, one typical conventional synchronization circuit includes a multistage delay circuit connected to receive a basic clock, which is composed of a system clock used for driving an overall system, or a clock obtained by dividing or multiplying the basic clock. For example, the multistage delay circuit includes K delay stages connected in series, and each of the K delay stages gives a delay of $T/(K+1)$ where T is a period of the basic clock applied to the multistage delay circuit. Thus, the multistage delay circuit outputs K delayed clocks which are delayed by $T/(K+1)$, $2T/(K+1)$, ..., $KT/(K+1)$, respectively. The synchronization circuit also includes a timing generator receiving a horizontal synchronization signal and operating to cause to select among the delayed clocks one delayed clock which becomes a high level within a constant time after receipt of each horizontal synchronization signal. Thereafter, the delayed clock having the same delay time as that of the selected delayed clock is outputted in each period of the basic clock as a scanning clock until a next horizontal synchronization signal is applied. In the above mentioned manner, a deviation of the obtained scanning clock from the horizontal synchronization signal has only the delay time of one stage of the multistage delay circuit at maximum.

However, the delay stages of the multistage delay circuit do not necessarily have a constant predetermined or designed delay time because of variation in manufacturing process, but rather, have a relatively large variation in delayed time. In addition, the designed delay time of each delay stage of the multistage delay circuit is often shortened or elongated upon variation in temperature. If the delay time of each delay stage of the multistage delay circuit is shortened, there will occur the case that the horizontal synchronization clock is applied after a rising edge of the maximum delayed clock before a rising edge of a next basic clock, and as a result, no scanning clock is generated. On the other hand, if the delay time of each delay stage of the multistage delay circuit is elongated, there will occur the case that two (or more) delayed clocks are outputted as the scanning clock in the same period of the basic clock.

SUMMARY OF THE INVENTION

Accordingly, it is an object of the present invention to provide a synchronization compensating circuit for use in a scanning type display circuit, which has overcome the above mentioned defect of the conventional one.

Another object of the present invention is to provide a synchronization compensating circuit for use in a scanning type display circuit, which is capable of generating a scanning clock at an optimum timing, without being influenced by variation of a delay time of a delay circuit caused by variations in manufacturing process and in temperature.

The above and other objects of the present invention are achieved in accordance with the present invention by a synchronization compensating circuit for use in a scanning type display circuit, comprising:

a first delay circuit receiving a basic clock having a period of T and composed of first to (K)th series-connected delay stages each giving a delay time of $T/(K+1)$;

a second delay circuit receiving an output of a final stage of the first delay circuit and composed of $(K+1)$th to $(K+L)$th series-connected delay stages each giving a delay time of $T/L$ where $2L=K+1$;

a timing signal generating circuit receiving a horizontal synchronization signal for generating a latch signal;

a first selection signal generation circuit having L inputs respectively receiving the basic clock and delayed clocks outputted from a first to $(K-1)/2$th delay stages of the first delay circuit and for latching the received clocks in response to the latch signal, the first selection signal generation circuit generating first to $(K+1)/2$th selection signals corresponding to the received clocks, an (N)th selection signal of the first to $(K+1)/2$th selection signals being activated when a latched (N)th input is at a low level and a latched $(N-1)$th input is at a high level $(N \leq L)$, the first selection signal generation circuit also generating a first inhibit signal activated when any one of the first to $(K+1)/2$th selection signals is activated;

a second selection signal generation circuit having L inputs respectively receiving delayed clocks outputted from $(K+1)/2$th to (K)th delay stages of the first delay circuit and for latching the received clocks in response to the latch signal, the second selection signal generation circuit generating $(K+3)/2$th to $(K+1)$th selection signals corresponding to the received clock, an $\{[(K+3)/2]+N\}$th selection signal of the $(K+3)/2$th to $(K+1)$th selection signals being activated when a latched $\{[(K+3)/2]+N\}$th input is at a low level and a latched $\{[(K+1)/2]+N\}$th input is at a high level, the second selection signal generation circuit also generating a second inhibit signal activated when any one of the $(K+3)/2$th to $(K+1)$th selection signals is activated;

a third selection signal generation circuit having L inputs respectively receiving delayed clocks outputted from $(K+1)$th to $(K+L)$th delay stages of the second delay circuit and for latching the received clocks in response to the latch signal, the third selection signal generation circuit generating $(K+2)$th to $(K+L+1)$th selection signals corresponding to the received clock, a $(K+N+1)$th selection signal of the $(K+2)$th to $(K+L+1)$th selection signals being activated when a latched $(K+N+1)$th input is at a low level and a latched $(K+N)$th input is at a high level;

a first inhibit circuit coupled to receive the $(K+3)/2$th to $(K+1)$th selection signals from the second selection signal generating circuit so as to output the received $(K+3)/2$th to $(K+1)$th selection signals, the first inhibit circuit being controlled by the first inhibit signal so as to inhibit from outputting the received $(K+3)/2$th to $(K+1)$th selection signals when the first inhibit signal is activated;

a second inhibit circuit coupled to receive the $(K+2)$th to $(K+L+1)$th selection signals from the third selection signal generating circuit so as to output the received (K+2)th to (K+L+1)th selection signals, the second inhibit circuit being controlled by the second inhibit signal so as to inhibit from outputting the received (K+2)th to (K+L+1)th selection signals when the second inhibit signal is activated; and a selection circuit receiving the basic clock and the delayed clocks outputted from the first to (K+L)th delay stages of the first and second delay circuits and also receiving the first to (K+1)/2th selection signals directly outputted from the first selection signal generation circuit and the (K+3)/2th to (K+L+1)th selection signals supplied through the first and second inhibit circuits, the selection circuit operating to output a delayed clock corresponding to an active selection signal.

In a preferred embodiment, the timing signal generating circuit generates a reset signal, and there is further provided an output circuit connected to an output of the selection circuit and controlled by the reset signal so as to output an initialized signal when the reset signal is active.

The above and other objects, features and advantages of the present invention will be apparent from the following description of a preferred embodiment of the invention with reference to the accompanying drawings.

DESCRIPTION OF THE PREFERRED EMBODIMENT

Figure 1:
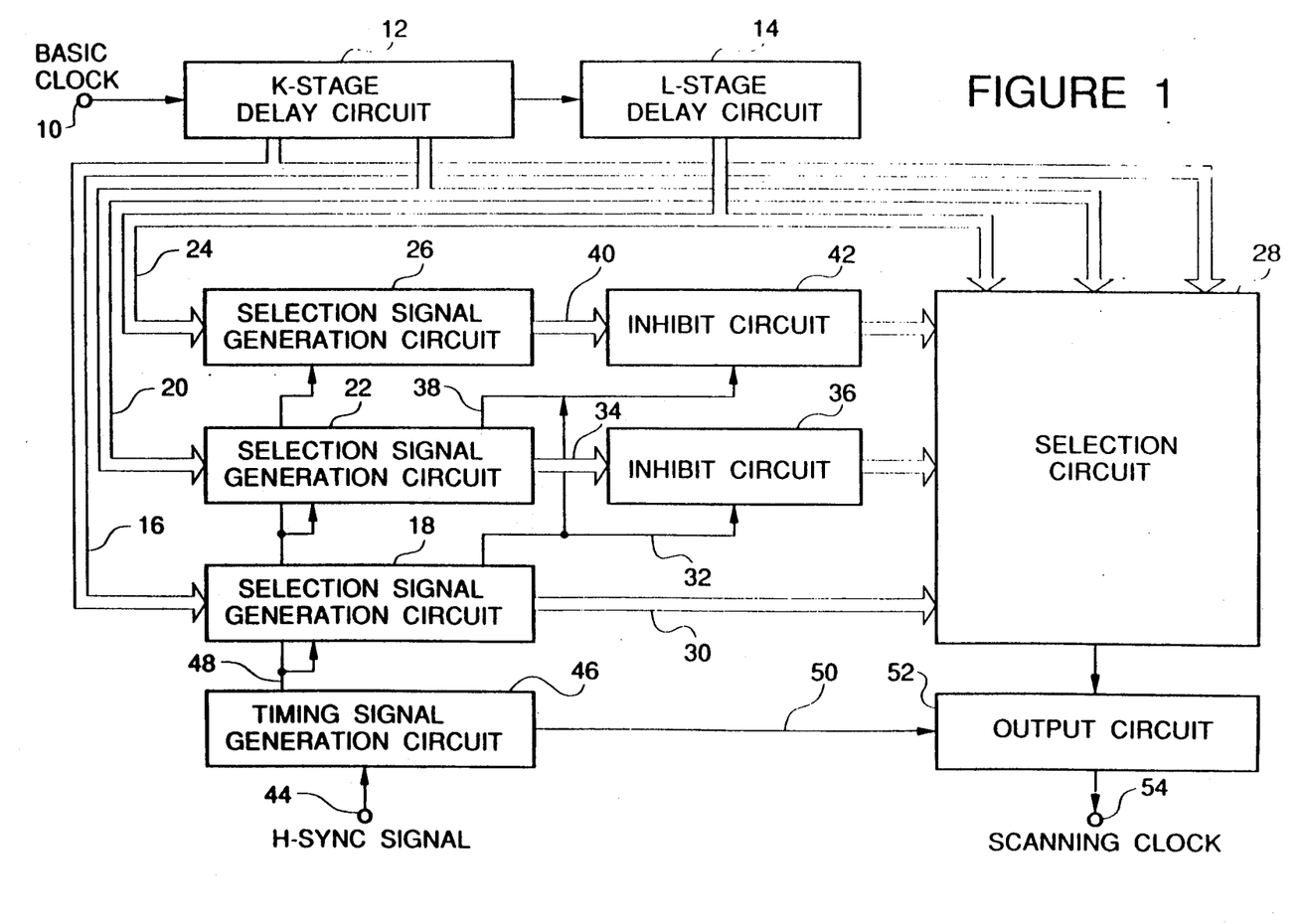
FIG. 1 is a block diagram of one embodiment of the synchronization compensating circuit in accordance with the present invention for use in a scanning type display circuit.

Referring to FIG. 1, there is shown a block diagram of one embodiment of the synchronization compensating circuit in accordance with the present invention for use in a scanning type display circuit.

Figure 2:
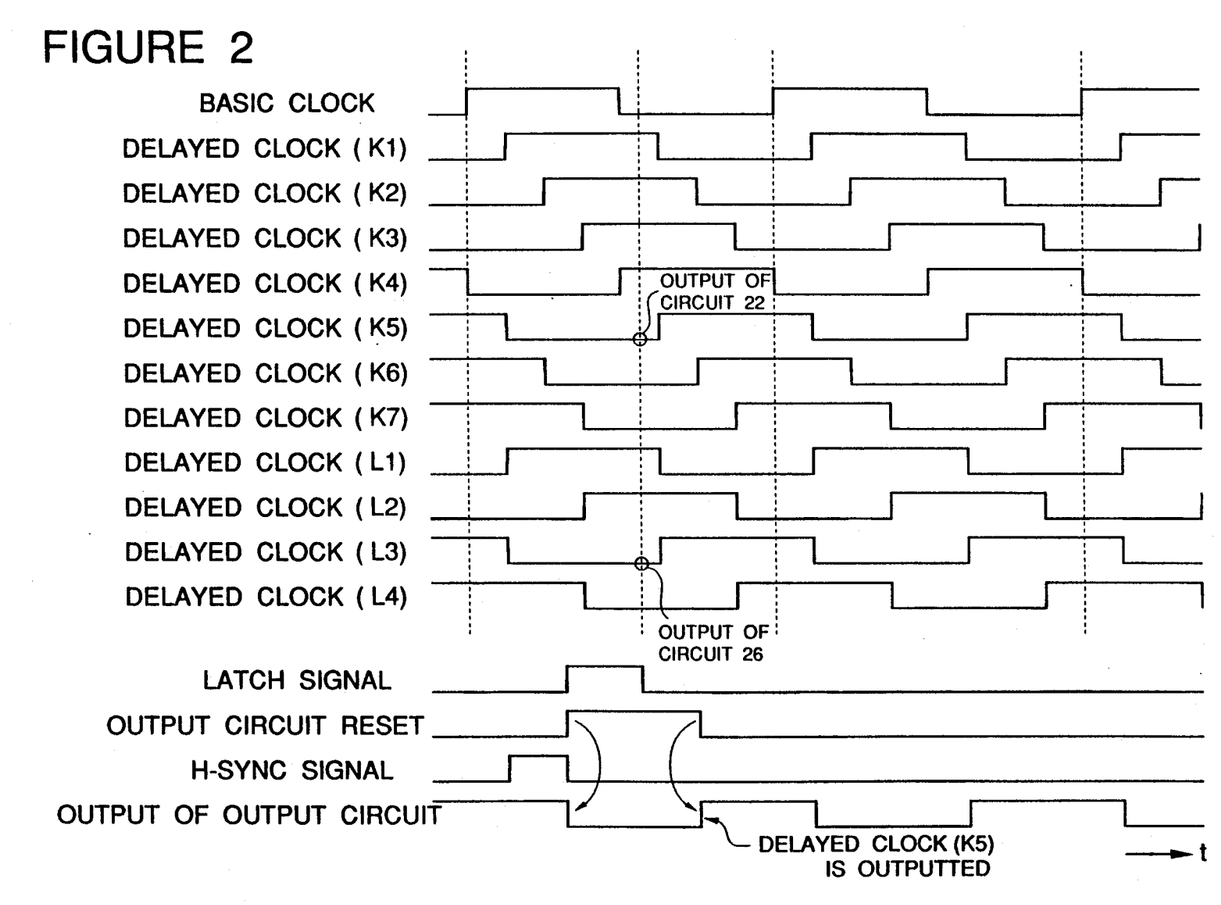
FIGS. 2 to 4 are timing charts illustrating an operation of the synchronization compensating circuit shown in FIG. 1 under three different delay time conditions.
Figure 3:
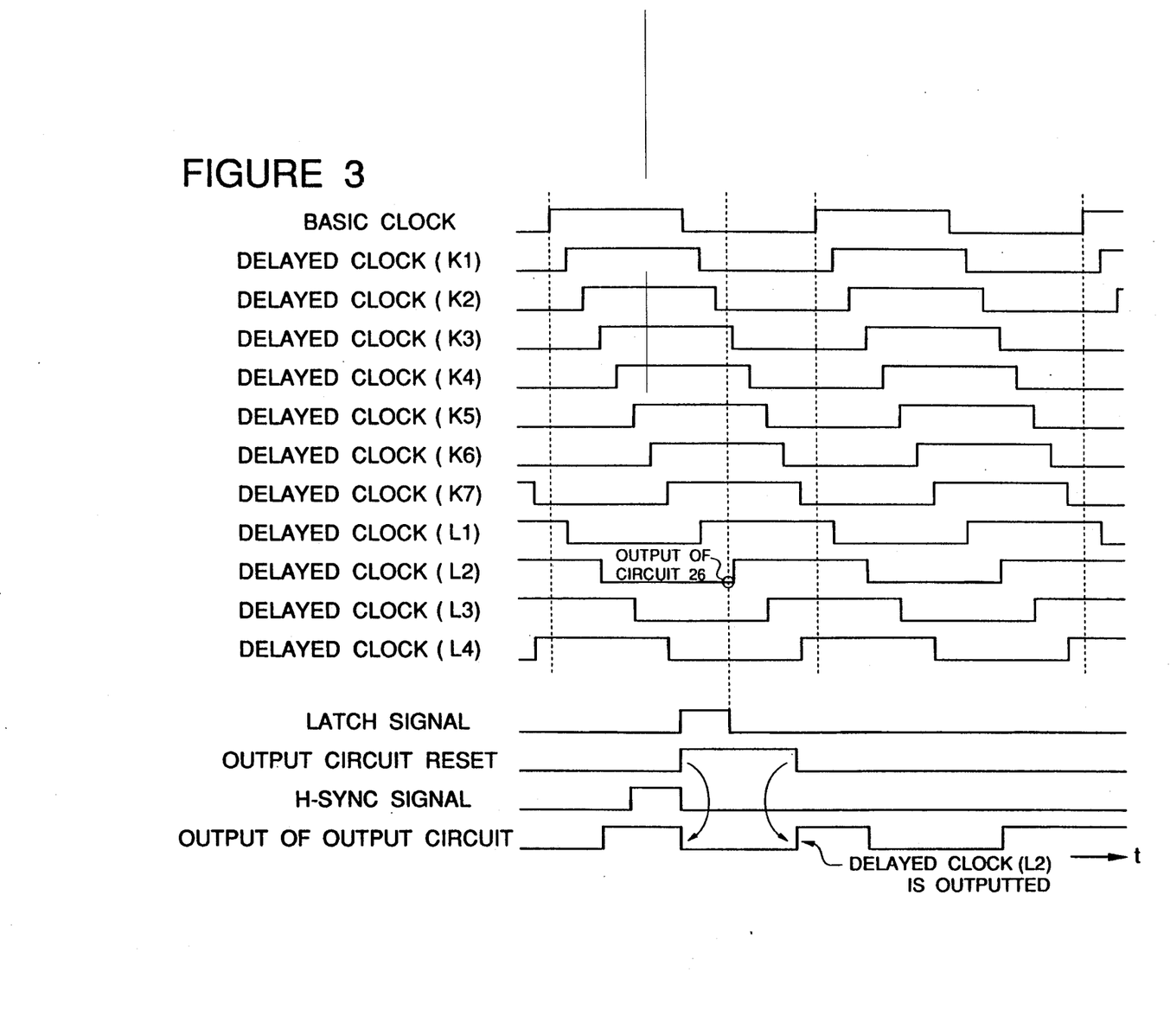
Figure 4:
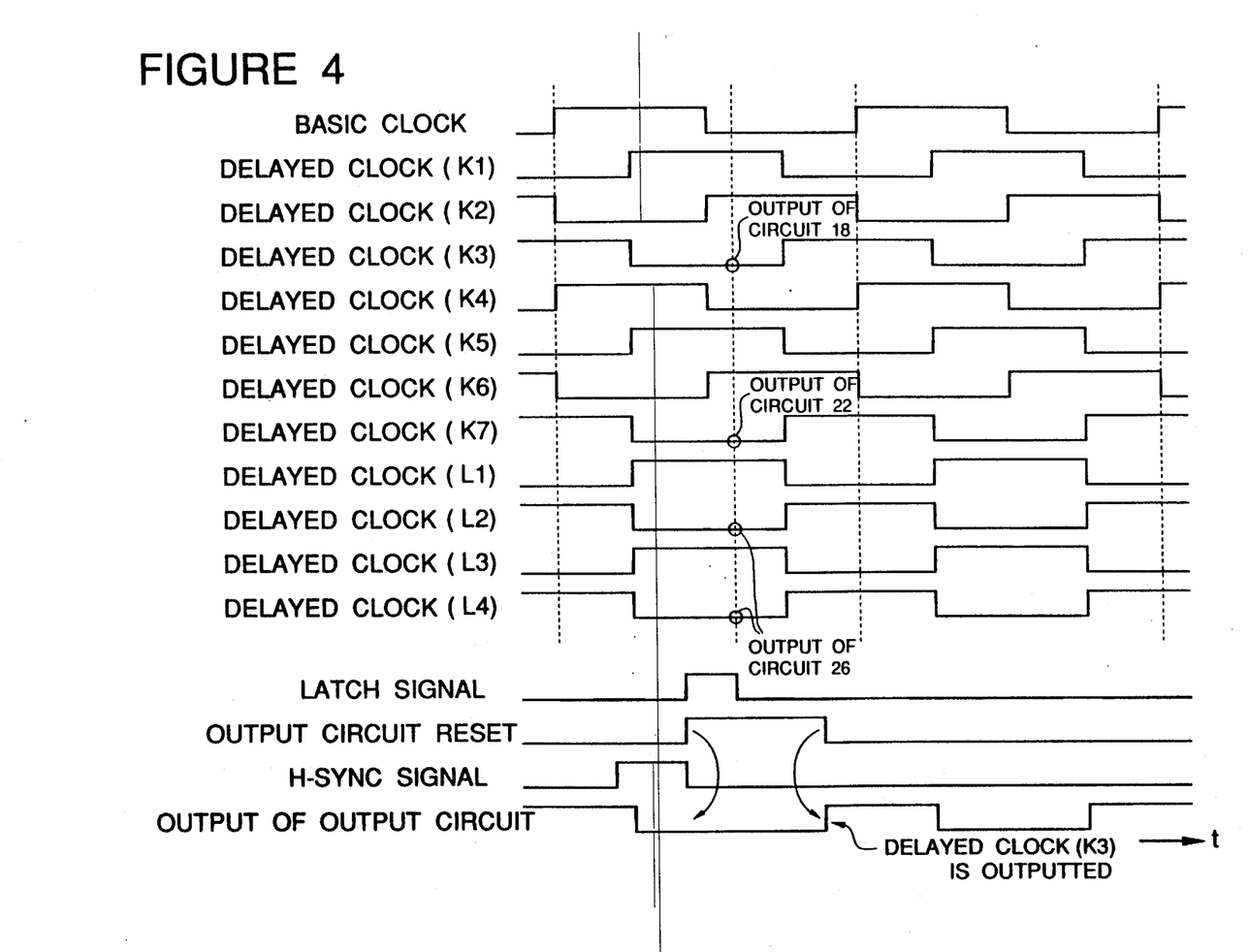

The shown circuit includes an input terminal 10 for receiving a basic clock which is composed of a system clock for timing an overall system or a clock obtained by frequency-dividing or frequency-multiplying the system clock. The input terminal 10 is connected to an input of a K-stage delay circuit 12, whose output is connected to an input of an L-stage delay circuit 14. The K-stage delay circuit 12 is composed of K delay stages connected in series, and the L-stage delay circuit 14 is composed of L delay stages connected in series. In the embodiment explained hereinafter with reference to FIGS. 2 to 4, K is 7 and L is 4. Each of the K delay stages of the K-stage delay circuit 12 has a preset or designed delay time obtained by dividing a period T of the basic clock by (K+1), namely 8, and each of the L delay stages of the L-stage delay circuit 14 has a preset or designed delay time obtained by dividing the period T of the basic clock by L, namely 4. In FIGS. 2 to 4, the parenthesized remarks following the legend "DELAYED CLOCK", such as "K1", "K2", ... "L1", "L2", ... etc., should be understood that the number after "K" indicates the order of a delayed stage within the K-stage delay circuit 12 outputting the delayed clock shown in the drawings, and the number after "L" indicates the order of a delayed stage within the L-stage delay circuit 14 outputting the delayed clock shown in the drawing. Therefore, the legend "DELAYED CLOCK (K1)" shows a delayed clock outputted from a first delayed stage of the K-stage delay circuit 12, and "DELAYED CLOCK (L2)" shows a delayed clock outputted from a second delayed stage of the L-stage delay circuit 14.

A delayed clock outputted from a fourth delay stage of the L-stage delay circuit 14, the basic clock applied to the input terminal 10 (an undelayed clock) and delayed clocks outputted from first to third delay stages of the K-stage delay circuit 12 are connected through a bus 16 to first to fifth inputs of a selection signal generation circuit 18, respectively. Delayed clocks outputted from third to seventh delay stages of the K-stage delay circuit 12 are connected through a bus 20 to first to fifth inputs of a selection signal generation circuit 22, respectively. The delayed clock outputted from the seventh delay stage of the K-stage delay circuit 12 and delayed clocks outputted from first to fourth delay stages of the L-stage delay circuit 12 are connected through a bus 24 to first to fifth inputs of a selection signal generation circuit 26, respectively. In addition, the basic clock applied to the input terminal 10, the delayed clocks outputted from all the delay stages of the K-stage delay circuit 12 and the delayed clocks outputted from all the delay stages of the L-stage delay circuit 14 are connected through the buses 16, 20 and 24 to a selection circuit 28.

The selection signal generation circuit 18 has first to fourth selection signals respectively corresponding to the second to fifth inputs of the selection signal generation circuit 18, namely to the basic clock applied to the input terminal 10 and the three delayed clocks outputted from the first to third delay stages of the K-stage delay circuit 12. The first to fourth selection signals of the selection signal generation circuit 18 are supplied through a bus 30 to the selection circuit 28. An (N)th selection signal of the selection signal generation circuit 18 is activated when such a condition is satisfied that the input corresponding to the (N)th selection signal is at a low level and the input corresponding to the (N−1)th selection signal is at a high level. Here, N is an arbitrary whole number, which is not greater than 4 in the shown embodiment. For example, if the delayed clock outputted from the second delay stage of the K-stage delay circuit 12 is at a low level, and the delayed clock outputted from the first delay stage of the K-stage delay circuit 12 is at a high level, the third selection signal of the selection signal generation circuit 18 corresponding to the delayed clock outputted from the second delay stage of the K-stage delay circuit 12 is activated. In this case, if N is 1, if the basic clock is at a low level, and the delayed clock outputted from the fourth delay stage of the L-stage delay circuit 14 is at a high level, the first selection signal of the selection signal generation circuit 18 corresponding to the basic clock is activated. In addition, the selection signal generation circuit 18 generates a first inhibit signal 32 activated when any one of the first to fourth selection signals of the selection signal generation circuit 18 is activated.

The selection signal generation circuit 22 has first to fourth selection signals respectively corresponding to the second to fifth inputs of the selection signal generation circuit 22, namely to the four delayed clocks outputted from the fourth to seventh delay stages of the K-stage delay circuit 12. The first to fourth selection signals of the selection signal generation circuit 22 are supplied through a bus 34 and an inhibit circuit 36 to the selection circuit 28. Similarly to the selection signal generation circuit 18, an (N)th selection signal of the selection signal generation circuit 22 is activated when such a condition is satisfied that the input corresponding to the (N)th selection signal is at a low level and the input corresponding to the (N−1)th selection signal is at a high level. For example, if the delayed clock outputted from the fifth delay stage of the K-stage delay circuit 12 is at a low level, and the delayed clock outputted from the fourth delay stage of the K-stage delay circuit 12 is at a high level, the second selection signal of the selection signal generation circuit 22 corresponding to the delayed clock outputted from the fifth delay stage of the K-stage delay circuit 12 is activated. Also, similarly to the selection signal generation circuit 18, the selection signal generation circuit 22 generates a second inhibit signal 38 activated when any one of the first to fourth selection signal of the selection signal generation circuit 22 is activated.

The selection signal generation circuit 26 has first to fourth selection signals respectively corresponding to the second to fifth inputs of the selection signal generation circuit 18, namely to the four delayed clocks outputted from the first to fourth delay stages of the L-stage delay circuit 14. The first to fourth selection signals of the selection signal generation circuit 26 are supplied through a bus 40 and an inhibit circuit 42 to the selection circuit 28. Similarly to the selection signal generation circuit 18, an (N)th selection signal of the selection signal generation circuit 26 is activated when such a condition is satisfied that the input corresponding to the (N)th selection signal is at a low level and the input corresponding to the (N−1)th selection signal is at a high level. For example, if the delayed clock outputted from the fourth delay stage of the L-stage delay circuit 14 is at a low level, and the delayed clock outputted from the third delay stage of the K-stage delay circuit 14 is at a high level, the fourth selection signal of the selection signal generation circuit 24 corresponding to the delayed clock outputted from the fourth delay stage of the L-stage delay circuit 14 is activated.

The first inhibit signal 32 outputted from the selection signal generation circuit 18 is supplied to the inhibit circuits 36 and 42, so that, when the first inhibit signal 32 is activated, the inhibit circuits 36 and 42 operate to inhibit the selection signals of the selection signal generation circuits 22 and 26 from being applied to the selection circuit 28. In addition, the second inhibit signal 38 outputted from the selection signal generation circuit 22 is supplied to the inhibit circuit 42, so that, when the second inhibit signal 38 is activated, the inhibit circuit 42 operates to inhibit the selection signals of the selection signal generation circuit 26 from being applied to the selection circuit 28.

The selection circuit 28 operates to output, among all the delayed clocks, one delayed clock corresponding to an activated selection signal supplied from the selection signal generation circuits 18, 22 and 26.

The shown circuit also includes another input terminal 44 for receiving a horizontal synchronism signal from a scan type display circuit (not shown). The input terminal 44 is connected to a timing signal generation circuit 46. When the horizontal synchronism signal is applied, the timing signal generation circuit 46 operates to output a latch signal 48 to the selection signal generation circuits 18, 22 and 26, so that the delayed clocks outputted from the two delay circuits 12 and 14 are inhibited from being inputted to the selection signal generation circuits 18, 22 and 26, and the selection signal generation circuits 18, 22 and 26 latch the delayed clocks inputted just before the input of the delayed clocks is inhibited. At the same time, the timing signal generation circuit 46 outputs a reset signal 50 to an output circuit 54 having an input connected to an output of the selection circuit 28 and an output connected to an output terminal 54 for outputting a synchronized scanning clock. When the reset signal 50 is applied to the output circuit 54, an output of the output circuit 52 connected to the output terminal 54 is forcibly initialized to a high level or a low level.

Now, operation of the shown circuit will be described with reference to timing charts shown in FIGS. 2 to 4. FIG. 2 illustrates the case in which each delay stage of the multistage delay circuits 12 and 14 has a preset or designed delay times.

In this case, when the basic clock as shown in FIG. 2 is applied to the input terminal 10, the multistage delay circuits 12 and 14 output the delayed clocks DELAYED CLOCK(K1), DELAYED CLOCK(K2), ... , DELAYED CLOCK(L4), as shown in FIG. 2. Under this condition, a horizontal synchronization signal is applied to the terminal 44, and in synchronism to a falling edge of the horizontal synchronization signal, the latch signal 48 and the reset signal 50 are brought to a high level. After a time sufficiently shorter than the period T of the basic clock, the latch signal 48 is brought to a low level, and after a further delay, the reset signal 50 is brought to a level. In response to the reset signal 50, the output of the selection circuit 28 is maintained at a low level during a period of time in which the reset signal 50 is at the low level.

In synchronism with the falling edge of the latch signal, the selection signal generation circuits 18, 22 and 26 latch the received basic clock and delayed clocks, respectively. As can be understood from FIG. 2, the selection signal generation circuit 18 generates no active selection signal. However, the selection signal generation circuit 22 generates an active selection sisnal corresponding to the delayed clock K5, andthe selection signal generation circuit 26 generates an active selection signal corresponding to the delayed clock L3. In this case, since the selection signal generation circuit 22 generates an active inhibit signal 32, the active selection signal outputted from the selection signal generation circuit 26 corresponding to the delayed clock L3 is blocked by the inhibit circuit 42, and therefore, is not supplied to the selection 28. Thus, after the signal 50 is brought to the low level so as to release the output circuit 52 from a reset condition, the election circuit 28 outputs the delayed clock K5, as shown in FIG. 2, and thereafter, continues to output the delay clock K5 in every period of the basic clock until a next horizontal synchronization signal is applied.

In the above mentioned embodiment, the circuit is set to fullfill a relation of $K=1+2L$. If this relation is fulfilled, when the delay time of each delay stage of the K-stage delay circuit 12 is shortened to a half of the designed delay value because of variations in manufacturing process and/or temperature, the delay time of each delay stage of the L-stage delay circuit 14 becomes equal to the designed delay time of each delay stage of the K-stage delay circuit 12. Therefore, as shown in FIG. 3, even if the delay time of the K-stage circuit 12 becomes a half and any delayed clock outputted from the K-stage delay circuit 12 is not selected, one of the delayed clocks outputted form the L-stage delay circuit 14 is selected by the selection signal generation circuit 26. In the embodiment shown in FIG. 3, the delayed clock L2 outputted from the second delay stage of the L-stage delay circuit 14 is outputted as the scanning clock, since neither of the selection signal generation circuits 18 and 22 generates the inhibit signal. In other words, even if the horizontal synchronization signal is applied at any timing, a delayed clock having a substantially constant time relation to the horizontal synchronization signal is selected and outputted as the scanning clock.

On the other hand, if the delay time of each delay stage of the K-stage delay circuit 12 is elongated to twice a designed value because of variations in manufacturing process and/or temperature, the delay time of each delay stage of the K-stage delay circuit 12 becomes equal to the designed delay time of each delay stage of the L-stage delay circuit 14. In this case, as shown in FIG. 4, there are outputted four active selection signals corresponding to the delayed clocks which fulfill the above mentioned condition that when the delayed clocks are latched, a delayed clock of a (N)th delay stage is at a low level and a delayed clock of a (N−1)th delay stage is at a high level. On the other hand, since the selection signal generation circuit 18 generates the first inhibit signal 32, the selectoin signals outputted from the selection signal generation circuits 22 and 26 are blocked by the inhibit circuits 36 and 42. Therefore, the active selection signal outputted from the selection signal generation circuit 22 corresponding to the seventh delay stage of the K-stage delay circuit 12 and the selection signals outputted from the selection signal generation circuit 26 corresponding to the second and fourth delay stages of the L-stage delay circuit 14 are invalidated, and only the active selection signal outputted from the selection signal generation circuit 18 corresponding to the third delay stage of the K-stage delay circuit 12 is applied to the selection circuit 28, so that the delayed clock K3 outputted from the third delay stage of the K-stage delay corcuit 12 is selected by the selection circuit 28 and outputted as the scanning clock.

Thus, there can be obtained the scanning clock having a feature that a maximum deviation between the scanning clock and the horizontal synchronization signal is limited to a delay time of one delay stage of the L-stage delay circuit.

As seen from the above, even if the delay time to the delay circuit varies within a range from a half of a designaed delay time to a double of the disigned delayed time because of variations in manufacturing process and/or temperature, a clock having a substantially constant time relation to the horizontal synchronization signal can be obtained. Therefore, it is possible to stably superimpose an insertion image into a scan type display screen.

The invention has thus been shown and described with reference to the specific embodiment. However, it should be noted that the present invention is in no way limited to the details of the illustrated structures but changes and modifications may be made within the scope of the appended claims.

We claim:

1. A synchronization compensating circuit for use in a scanning type display circuit, comprising:
   a first delay circuit receiving a basic clock having a period of T and composed of first to (K)th series-connected delay stages each giving a delay time of $T/(K+1)$ wherein K is an integer greater than or equal to one;
   a second delay circuit receiving an output of a final stage of said first delay circuit and composed of $(K+1)$th to $(K+L)$th series-connected delay stages each giving a delay time of $T/L$ where $2L=K+1$;
   a timing signal generating circuit receiving a horizontal synchronization signal for generating a latch signal;
   a first selection signal generation a circuit having L inputs respectively receiving said basic clock and delayed clocks outputted from a first to $(K−1)/2$th delay stages of said first delay circuit and for latching the received clocks in response to said latch signal, said first selection signal generation circuit generating first to $(K+1)/2$th selection signals corresponding to the received clocks, an (N)th selection signal of said first to $(K+1)/2$th selection signals being activated when a latched (N)th inputs is at a low level and a latched (N−1)th input is at a high level (N≦L), wherein N is an integer, said first selection signal generation circuit also generating a first inhibit signal activated when any one of said first to $(K+1)/2$th selection signals is activated;
   a second selection signal generation circuit having L inputs respectively receiving delayed clocks outputted from $(K+1)/2$th to $(K)$th delay stages of said first delay circuit and for latching the received clocks in response to said latch signal, said second selection signal generation circuit generating $(K+3)/2$th to $(K+1)$th selection signals corresponding to the received clock, an $\{[(K+3)/2]+N\}$th selection signal of said $(K+3)/2$th to $(K+1)$th selection signals being activated when a latched $\{[(K+3)/2]+N\}$th input is at a low level and a latched $\{[(K+1)/2]+N\}$th input is at a high level, said second selection signal generation circuit also generating a second inhibit signal activated when any one of said $(K+3)/2$th to $(K+1)$th selection signals is activated;
   a third selection signal generation circuit having L inputs respectively receiving delayed clocks outputted from $(K+1)$th to $(K+L)$th delay stages of said second delay circuit and for latching the received clocks in response to said latch signal, said third selection signal generation circuit generating $(K+2)$th to $(K+L+1)$th selection signals coresponding to the received clock, a $(K+N+1)$th selection signal of said $(K+2)$th to $(K+L+1)$th selection signals being activated when a latched $(K+N+1)$th input is at a low level and a latched $(K+N)$th input is at a high level;
   a first inhibit circuit coupled to receive said $(K+3)/2$th to $(K+1)$th selection signals from said second selection signal generating circuit so as to output the received $(K+3)/2$th to $K+1)$th selection signals, said first inhibit circuit being controlled by said first inhibit signal so as to inhibit from outputting the received $(K+3)/2$th to $(K+1)$th selection signals when said first inhibit signal is activated;
   a second inhibit circuit coupled to receive said $(K+2)$th to $(K+L+1)$th selection signals from said third selection signal generating circuit so as to output the received $(K+2)$th to $(K+L+1)$th selection signals, said second inhibit circuit being controlled by said second inhibit signal so as to inhibit from outputting the received (K+2)th to (K+L+1)th selection signals when said second inhibit signal is activated; and a selection circuit receiving said basic clock and the delayed clocks outputted from said first to (K+L)th delay stages of said first and second delay circuits and also receiving said first to (K+1)/2th selection signals directly outputted from said first selection signal generation circuit and said (K+3)/2th to (K+L+1)th selection signals supplied through said first and second inhibit circuits, said selection circuit operating to output a delayed clock corresponding to an active selection signal.

2. A synchronization compensating circuit claimed in claim 1 wherein said timing signal generating circuit generates a reset signal, and further including an output circuit connected to an output of said selcetion circuit and controlled by said reset signal so as to output an initialized signal when said reset signal is active.

3. A synchronization compensating circuit for use in a scanning type display circuit, comprising:

a first multistage delay circuit receiving a basic clock for generating K delayed clocks wherein K is an integer greater than or equal to one;

a second multistage delay circuit receiving an output of said first multistage delay circuit for generating L delayed clocks wherein L is an integer greater than or equal to one;

a timing signal generating circuit receiving a horizontal synchronization signal for generating a latch signal;

a first selection signal generation circuit latching a first phase of said basic clock and said K delayed clocks in response to said latch signal, for generating a selection signal corresponding to a received clock fulfilling a predetermined condition;

a second selection signal generation circuit latching a second phase of said basic clock and said K delayed clocks in response to said latch signal, for generating a selection signal corresponding to a received clock fulfilling a predetermined condition;

a third selection signal generation circuit latching said L delayed clocks in response to said latch signal, for generating a selection signal corresponding to a received clock fulfilling a predetermined condition; and a selection circuit reciving said basic clock and said K and L delayed clocks for outputting a delayed clock corresponding to the selection signal outputted from said first selection signal generation circuit in preference to the selection signal from said second and third selection generation circuits and a delayed clock corresponding to the selection signal outputted from said second selection signal generation circuit in preference to the selection signal from said third selection signal generation circuit when the selection signal is not outputted from said first selection signal generation circuit.

* * * * *

UNITED STATES PATENT AND TRADEMARK OFFICE
CERTIFICATE OF CORRECTION

PATENT NO. : 5,101,118

DATED : March 31, 1992

INVENTOR(S) : Toshiyuki KUMAGAI, Hiroyuki SUZUKI

It is certified that error appears in the above-identified patent and that said Letters Patent is hereby corrected as shown below:

Col. 6, line 40, delete "sisnal" and insert --signal--;

Col. 6, line 41, delete "andthe" and insert --and the--;

Col. 7, line 26, delete "selectoin" and insert --selection--;

Col. 7, line 40, delete "corcuit" and insert --circuit--;

Col. 7, lines 48 and 49, delete "designaed" and insert --designed--;

Col. 7, line 49, delete "disigned" and insert --designed--;

Col. 9, line 19, delete "selcetion" and insert --selection--.

Signed and Sealed this

Fifteenth Day of June, 1993

Attest:

MICHAEL K. KIRK

Attesting Officer

Acting Commissioner of Patents and Trademarks